Jan. 2, 1951 R. H. VARIAN ET AL 2,536,112
AIRCRAFT LANDING SYSTEM
Original Filed Nov. 22, 1943 2 Sheets-Sheet 1
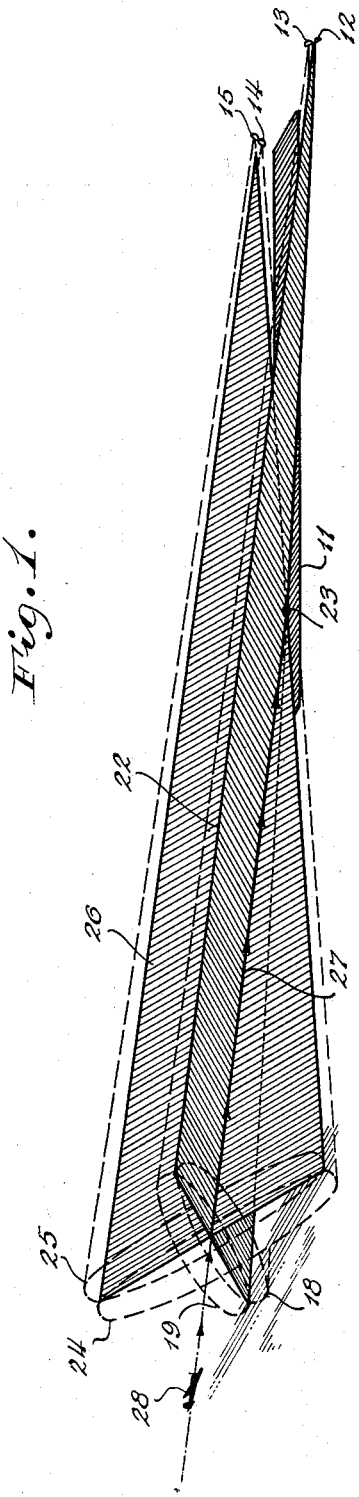
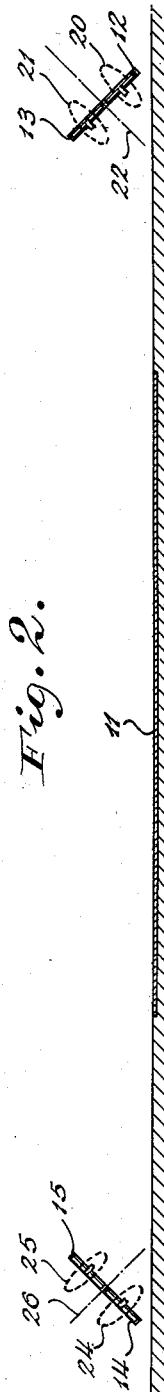
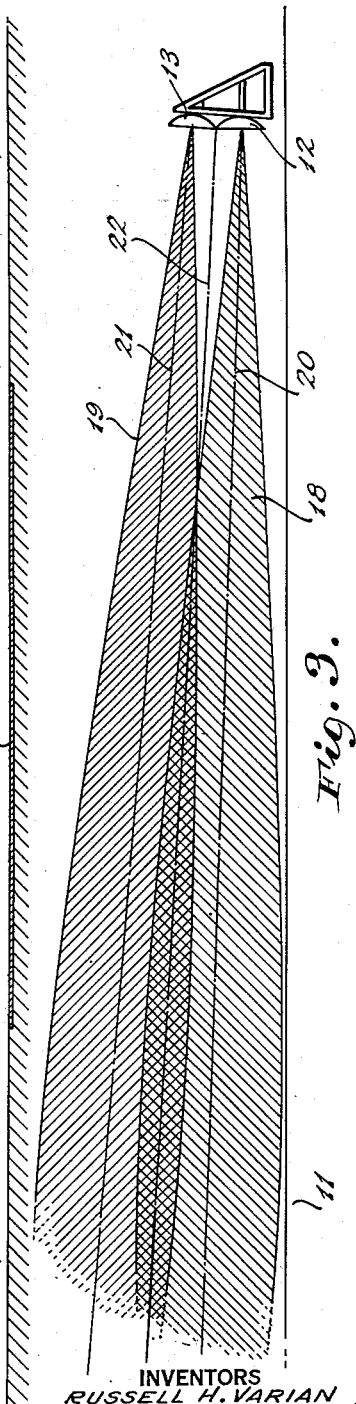
INVENTORS
RUSSELL H. VARIAN
THOMAS M. FERRILL, JR.
BY
ATTORNEY

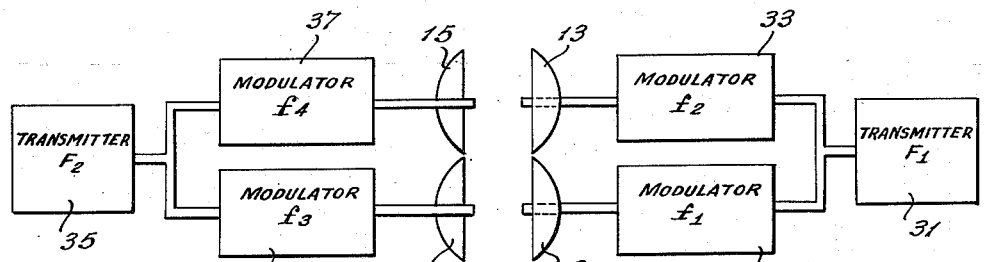
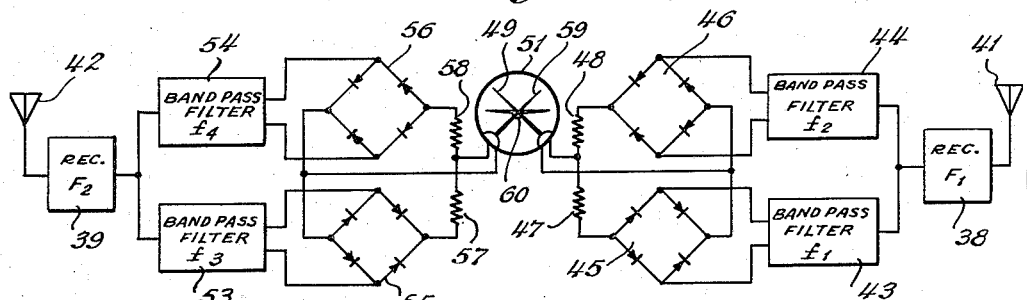
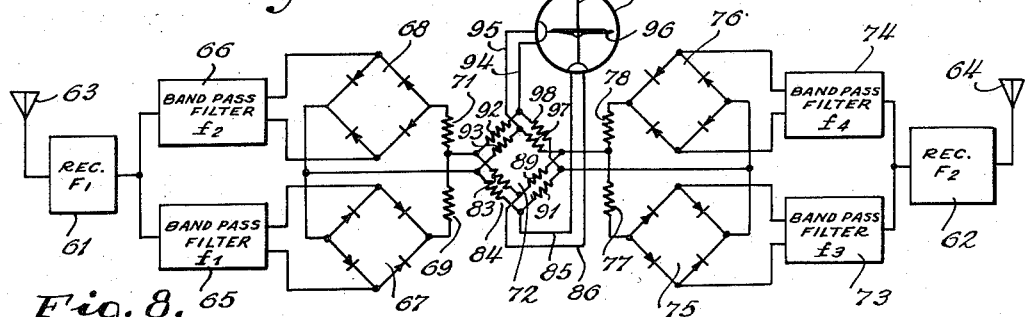
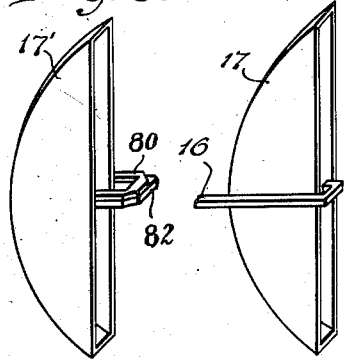
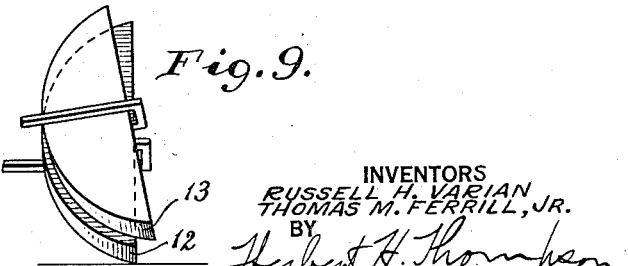
INVENTORS
RUSSELL H. VARIAN
THOMAS M. FERRILL, JR.
BY
Herbert H. Thompson
ATTORNEY.

Patented Jan. 2, 1951

2,536,112

UNITED STATES PATENT OFFICE 2,536,112

AIRCRAFT LANDING SYSTEM

Russell H. Varian, Garden City, and Thomas M. Ferrill, Jr., Hempstead, N. Y., assignors to The Sperry Corporation, a corporation of Delaware Continuation of application Serial No. 511,286, November 22, 1943. This application April 18, 1946, Serial No. 663,060

17 Claims. (Cl. 343—108)

This invention relates generally to landing systems for aircraft in which a landing path is formed by a plurality of radio beams.

The present application is a continuation of patent application Serial No. 511,286 filed November 22, 1943, now abandoned.

In landing systems heretofore used, a landing path for the aircraft has usually been formed by the intersection of a vertical plane and a plane inclined at an angle corresponding to the desired angle of the landing path. These vertical and inclined planes, sometimes referred to as localizer and glide path planes, may be produced in several different ways by radio beams radiating from localizer and glide path transmitters.

In a landing system of this type, the angle of inclination of the landing path is determined by the inclination of the glide path plane. Therefore, the glide path transmitter must be located in the vicinity of the intersection of the landing path with the ground which corresponds approximately to the point at which the plane lands.

Although the glide path transmitter is customarily located at one side of the contact point to avoid interference with aircraft which may be landing, it forms an obstruction which may interfere with landings of other aircraft on adjacent runways within a particular landing area. Since the glide path transmitter is arranged in the vicinity of the landing point, some difficulties have been encountered due to course sharpening as an approaching aircraft nears the landing point.

A major object of the present invention is to provide a landing system in which the transmitters defining a landing path may be located outside of the landing area.

Another object of the invention is to provide a landing system in which the transmitters defining a landing path may be located at a point remote from the landing point.

A further object of the invention is to produce a landing path in a landing system by the intersection of two inclined signal surfaces.

A still further object of the invention is to provide an indicating system which converts the displacements relative to one pair of coordinate axes to corresponding displacements relative to a second pair of coordinate axes rotated by approximately 45° with respect to the first pair of axes.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

Other objects and advantages of the invention will become apparent from the following specification, taken in connection with the accompanying drawings, wherein Fig. 1 is a perspective diagrammatic view of a landing area showing a landing path defined by radio beams, according to a preferred form of the invention;

Fig. 2 is an elevation view of the landing area shown in Fig. 1 as seen from a point in front of the radiators;

Fig. 3 is a view of the radiators and their respective beams, as seen from the direction of the arrow in Fig. 1;

Fig. 4 is a schematic block diagram of an arrangement of a transmitter system suitable for producing a landing path according to the invention;

Fig. 5 is a schematic circuit diagram of a receiver system adapted to be carried by an aircraft for use in directing the aircraft along the landing path shown in Fig. 1;

Fig. 6 is a schematic circuit diagram of a modified receiver system having a special circuit for the received signals to actuate a normally oriented cross pointer indicator;

Fig. 7 is a perspective view of a single-beam directive radiator;

Fig. 8 is a perspective view of a dual-beam radiator; and

Fig. 9 is an elevation of a pair of single-beam directive radiators oriented for producing an inclined equisignal surface.

According to the invention in its preferred form, directional radiators are positioned beyond one end of a runway or landing strip to produce two signal surfaces, such as equisignal planes, arranged symmetrically relative to the landing runway and intersecting to form a landing path. The radiators are preferably positioned so the equisignal planes are inclined at equal angles relative to the landing area and so directed relative to each other that the landing path intersects the runway at the most desirable landing point along the length of the runway.

In this manner the landing path is formed by the intersection of two equisignal planes or signal surfaces inclined to a horizontal plane or the plane of the landing area. Thus, the signal surfaces whose intersection defines the landing path are both angularly disposed with respect to a lateral plane including the landing path, that is a plane including the landing path and a horizontal line perpendicular thereto. The inclination of the landing path depends upon the angle of inclination of both planes and the horizontal angle between them. As shown in Fig. 1, radio beams are arranged to form a landing path for a landing strip 11 which may be one of many landing strips within a particular landing area. Four radiators of electromagnetic energy 12, 13, 14 and 15 are arranged in two pairs, one pair on each side of the landing strip and beyond the end of the strip. In the drawing the end of the landing strip is considered the end of the landing area, so the radiators are positioned just beyond the landing area. As will become apparent, the radiators may be placed at a much greater distance from the landing strip if desired.

The radiators may be of the type shown in Fig. 7, in which electromagnetic energy is supplied from a suitable transmitter as by a wave guide 16 which emits high frequency energy at the focal point of a reflector 17 having the form of a cylindrical parabola. As is well known, a reflector of this type provides a fan-shaped beam of energy having a substantially elliptical cross-sectional intensity contour, i. e. a relatively thin pattern of appreciable width, as exemplified in the dotted line cross-sectional outlines in Fig. 2, and the similar outline representations at the left-hand end of Fig. 1.

The two radiators 12 and 13 on one side of the landing strip 11 are arranged one above the other and have their directivity axes 20 and 21 (Fig. 3) angularly offset to project beams 18 and 19 of radiant energy which produce a signal surface in the form of an equisignal plane 22. This equisignal plane 22 is the locus of points at which the energy of both of the beams is at the same intensity level.

As shown in Fig. 2, the radiators 12 and 13 are preferably inclined so the equisignal plane 22 produced by means of 18 and 19 is inclined to the plane of the landing area at an angle of approximately 45 degrees. The radiators 12 and 13 are directed, by turning them together about a vertical axis, so the equisignal plane 22 intersects a landing point 23 which corresponds approximately to the point at which it is desired for an approaching aircraft to land. The radiators 12 and 13 may then be adjusted about an axis perpendicular to the equisignal plane 22 to direct the maximum strength of the radiators as desired to provide the best reception by an approaching aircraft.

The radiators 14 and 15 are arranged on the opposite side of the landing strip to project beams 24 and 25 of electromagnetic energy which have their axes offset so the beams form a signal surface such as equisignal plane 26 corresponding to the equisignal plane 22 formed by the beams 20, 21. The radiators 14 and 15 are inclined to the landing area so the plane 26 is arranged at any desired angle, preferably 45 degrees. The radiators 14 and 15 are directed, by turning them together about a vertical axis, so the equisignal plane 26 passes through the landing point 23. When thus arranged, the equisignal plane 26 intersects the equisignal plane 22 to form a landing path 27.

This landing path, since it is formed by the intersection of two planes which pass through the landing point 23, must also pass through the landing point 23. It will be apparent, therefore, that the intersection of equisignal planes or signal surfaces 22 and 26 forms a landing path 27 for guiding an approaching aircraft 28 to land at the point 23 on the landing strip 11.

One arrangement of transmitters for supplying energy to the radiators is shown in the schematic block diagram of Fig. 4. A transmitter 31 generates high frequency energy of a carrier frequency $F_1$ which is connected to a pair of modulators 32 and 33 that supply the high frequency carrier modulated by signal frequencies $f_1$ and $f_2$, preferably audio frequencies, to the radiators 12 and 13, respectively. The radiators 12 and 13 thus radiate energy of the same carrier frequency $F_1$ in two beams 18 and 19 which are modulated at audio signal frequencies $f_1$ and $f_2$, respectively.

In a similar manner a transmitter 35 supplies high-frequency energy of a frequency $F_2$ to modulators 36 and 37, which modulate the high-frequency energy generated by the transmitter 35 at audio signal frequencies $f_3$ and $f_4$, respectively.

The energy generated by the transmitters 31 and 35 is preferably of slightly different frequencies to avoid interference between the beams radiated by the two pairs of antennas. However, this is not essential to the present invention. It is only necessary that receivers carried by the aircraft be able to identify each of the four beams either by differences in the carrier frequencies or by differences in the modulating signals.

Since the transmitters are shown as having different carrier frequencies $F_1$ and $F_2$, receivers 38 and 39 (Fig. 5) connected to antennas 41 and 42, that are carried by aircraft using the landing system, are tuned to receive carrier frequencies $F_1$ and $F_2$, respectively. The receiver 38 is connected to a pair of band-pass filters 43 and 44 which are adapted to pass signal frequencies $f_1$ and $f_2$, respectively. The outputs of these filters 43 and 44 are connected across rectifier bridge circuits 45 and 46 which have their outputs connected in opposition, through resistors 47 and 48 to one pointer 49 of a cross-pointer indicator 51. The voltages produced by the rectifier circuits 45 and 46 depend upon the intensity of the energy modulated by frequencies $f_1$ and $f_2$ as received from beams 18 and 19, respectively. Therefore, the voltages of these rectifiers, which are applied in opposition to the pointer 49, depend upon the position of the aircraft relative to the equisignal plane 22.

Thus, the polarity and magnitude of the voltage applied to the pointer depends upon the direction and magnitude of the displacement of the aircraft relative to the equisignal plane 22. It will be apparent that the pointer 49 is displaced from its neutral position in a direction and an amount corresponding to the direction and amount of the displacement of the aircraft from the equisignal plane 22.

In a similar manner the receiver 39, which is tuned to the carrier frequency $F_2$, is connected to band-pass filters 53 and 54 that respond to signal frequencies $f_3$ and $f_4$ and have their outputs supplied to bridge rectifier circuits 55 and 56, respectively. The outputs of the bridge rectifier circuits 55 and 56, that depend upon the intensity of energy received from beams 24 and 25, are connected in opposition through resistors 57 and 58 to the other pointer 59 of the cross-pointer indicator 51. In this manner, the pointer 59 is displaced from its neutral position in a direction and an amount corresponding to the direction and amount of displacement of the aircraft relative to the equisignal plane 26.

The cross-pointer indicator 51 is mounted in such a way that its pointers 49 and 59 are inclined to the horizontal in substantially the same manner as the equisignal planes 22 and 26 to which they respond. In this way the intersection of the pointers relative to a reference mark 60 indicates the displacement between the aircraft and the landing path.

This arrangement of the pointers of a cross-pointer indicator differs somewhat from the system conventionally employed in instrument landing systems. Since the displacement of the aircraft from either of the signal surfaces includes both horizontal and vertical components, deviation of either pointer from its neutral position cannot easily be corrected by a single adjustment of only one of the conventional controls for the aircraft. This may be advantageous under certain conditions, in that it requires the pilot to devote equal attention to both pointers.

In order that pilots trained to use a cross-pointer indicator having horizontal and vertical pointers may use the landing system, a receiver such as that shown in Fig. 6 may be employed. This receiver determines the displacement of the aircraft relative to the inclined equisignal planes 22 and 26, in the same manner as the receiver shown in Fig. 5, but converts the displacements thus determined into vertical and lateral displacements of the aircraft relative to the landing path. These vertical and lateral displacements operate horizontal and vertical pointers of a cross-pointer indicator mounted in a conventional manner in the aircraft.

The receiving apparatus shown in Fig. 6 includes receivers 61 and 62, connected to antennas 63 and 64 and tuned to carrier frequencies $F_1$ and $F_2$, respectively, for detecting energy received from each pair of beams. The receiver 61 detects energy from the radiators 12 and 13 and supplies it to band-pass filters 65 and 66, which pass energy modulated by frequencies $f_1$ and $f_2$, respectively. The band-pass filters 65 and 66 are connected across bridge detector circuits 67 and 68 whose outputs are connected in opposition through resistors 69 and 71 to a double bridge circuit designated generally at 72.

In a similar manner the receiver 62 detects energy having a carrier frequency $F_2$ radiated by radiators 14 and 15 and supplies these detection signals to band-pass filters 73 and 74 which pass signals of frequencies $f_3$ and $f_4$, respectively. The outputs of band-pass filters 73 and 74 are connected across bridge rectifying circuits 75 and 76, the outputs of which are connected in opposition through resistors 77 and 78 to the double bridge circuit 72.

As previously explained in connection with Fig. 5, the voltage produced by the combination of the outputs of rectifier circuits in opposition corresponds in polarity and magnitude to the direction and amount of displacement of the aircraft relative to the respective equisignal planes which define the landing path. This displacement is, of course, measured as the shortest distance from each plane. In order to convert the displacement of the aircraft relative to the inclined equisignal planes 22 and 26, as represented by the combined output of the rectifier circuits 67 and 68 and the combined output of the rectifier circuits 75 and 76, respectively, the sum of these outputs is used to actuate one pointer of the cross-pointer indicator 81 and the difference of these outputs is used to actuate the other pointer of the indicator 81. The combination of the outputs in sum and difference circuits is accomplished by the double bridge circuits 72.

From an examination of the circuit 72, as shown in Fig. 6, a combined output of the rectifier circuits 67 and 68, representing the displacement of the aircraft relative to the equisignal plane 22 is supplied through resistors 83 and 84 and leads 85 and 86 to the vertical pointer 87 of the cross-pointer indicator 81. The combined outputs of the rectifier circuits 75 and 76, representing the displacement of the aircraft from the equisignal plane 26 is added to that from the other rectifier circuits through resistors 89 and 91 to the leads 85 and 86 which are connected to the vertical pointer 87.

The combined output of rectifiers 67 and 68 is also connected through resistors 92 and 93 and leads 94 and 95 to horizontal pointer 96 of the indicator 81. Opposed to these signals is the combined output of rectifiers 75 and 76 which is connected in opposition through resistors 97 and 98 to the leads 95 and 94 which actuate the horizontal pointer 96.

Although the circuit 72 shows the sum of the outputs of rectifier circuits applied to the vertical pointer 87 and the difference of these outputs applied to the horizontal pointer 96, it will be obvious that the circuit could be reversed to apply the difference to the vertical pointer and the sum to the horizontal pointer without departing from the invention.

The receiving apparatus shown in Fig. 6 determines the displacement of the aircraft relative to the inclined equisignal planes 22 and 26 and converts these displacements to lateral and vertical displacements of the aircraft from the landing path 27. These lateral and vertical displacements actuate normally vertical and normally horizontal pointers 87 and 96 of the cross-pointer indicator 81. This system provides a pilot with the same indication for landing his aircraft as that provided by a cross-pointer meter which has its vertical and horizontal pointers controlled by energy received from localizer and glide path transmitters. Obviously, this converting system may also be used with a glide path and localizer landing system to actuate a cross-pointer indicator having inclined pointers. In this case, the sum and difference of the glide path and localizer signals are converted to actuate the inclined pointers of the indicator.

The displacements of the craft from the equisignal planes may be considered as displacements relative to a pair of coordinate axes, which correspond to the lines formed by the intersection of the equisignal planes including the position of the craft and perpendicular to the equisignal planes. One indicating pointer is actuated according to the sum and another indicating pointer is actuated according to the difference of the displacements relative to the pair of coordinate axes to indicate the position of the aircraft relative to a second pair of coordinate axes, which, in the present case, are horizontal and vertical axes.

By the arrangement described, the indicating system corrects displacements of an object relative to one pair of coordinate axes to displacements relative to a second pair of axes that are angularly displaced with respect to the first pair. In the preferred form, the coordinate axes in both cases are mutually perpendicular and the two pairs of axes are angularly displaced by forty-five degrees. This is due to the fact that the indicators indicate the displacements of the object relative to a second pair of axes which bisect the angles formed by the first pair of axes. Hence, if the first coordinate axes are not mutually perpendicular, the second axes are not rotated by forty-five degrees. The angle of rotation depends upon the angles formed by the first pair of axes, since the second pair bisects these angles.

The equisignal planes 22 and 26 may be inclined at any desired angle to the landing area.

As previously stated, these planes are preferably arranged symmetrically relative to the landing strip 11. When the equisignal planes 22 and 26 are arranged at forty-five degree angles, as shown in the drawings, a substantially uniform sensitivity is provided at the receiver for displacement of the aircraft in all directions from the landing path 27. If both of the equisignal planes 22 and 26 are inclined at an angle other than forty-five degrees, the ratio of vertical to lateral sensitivity is changed. This may be desirable in particular circumstances. However, for more universal use, the arrangement of the radiators to produce equisignal planes inclined at angles of forty-five degrees is preferred.

Although the equisignal planes are preferably arranged symmetrically relative to the landing strip, it will be apparent to those skilled in the art that the landing path may be defined by the intersection of planes inclined at different angles without departing from the invention.

It is contemplated that many different types of radiators may be substituted for those shown in the accompanying drawings. For example, it is not essential that two reflectors be used on each side of the landing strip 11. As is now well known, and as shown in Fig. 8, a single reflector 17' of the same type as reflector 17 shown in Fig. 7 may be supplied by two wave guides 80 and 82 which radiate high frequency energy at points slightly offset relative to the focal point of the reflector. This single reflector type of radiator projects a pair of divergent beams of radio energy in substantially the same manner as the dual radiator system already described. Energy emerging from upper wave guide 80 at a first point in the focal region of reflector 17' is reflected by the reflector 17' to form a lower directive beam and energy emerging from wave guide 82 at a point slightly lower than said first point is reflected by the reflector 17' to form an upper directive beam. If a dual-beam radiator such as that illustrated in Fig. 8 is employed instead of a pair of single-beam radiators 12 and 13 (Fig. 4), for example, wave guide 80 is coupled to the lower-beam modulator 32 and wave guide 82 is coupled to the upper-beam modulator 33. Another dual-beam radiator of the same type may be employed instead of the single-beam radiators 14 and 15 associated with transmitter 35 and modulators 36 and 37, Fig. 4.

Where two separate single-beam radiators are employed for defining each equisignal plane or surface, the relative orientations of the radiators may be readily fixed according to the desired orientation of the equisignal surface. To accomplish this, the reflectors may be arranged vertically, horizontally, or at any angle, with their directivity axes substantially parallel. An equisignal plane may then be provided at any desired inclination to the landing area by turning the radiators relative to each other about an axis in the desired equisignal plane. As illustrated in Fig. 9, for example, two directive radiators 12' and 13', each similar to the radiator 16, 17 shown in Fig. 7, are arranged in parallel relation at an angle of inclination of approximately 45 degrees. The directive axes of these radiators originally were aimed along substantially parallel lines. Radiator 12' was thereafter rotated through a very small angle in a clockwise direction, and radiator 13' was rotated through an equal angle in a counterclockwise direction. These radiators are positioned to generate a pair of divergent directivity patterns or beams defining an inclined equisignal plane or surface which contains the parallel lines along which the radiators 12' and 13' originally were aimed.

Although the system heretofore described defines the landing path by the intersection of inclined signal surfaces in the form of two equisignal planes, it is contemplated that the invention may be applied to a system employing curved equisignal surfaces, as distinguished from planar surfaces. For example, equisignal surfaces may be developed by concentric beams of circular or elliptical cross-section. Thus, if two beams, such as those shown in Fig. 1 are projected so their axes are coincident, but one beam is slightly broader than the other, an equisignal surface having a substantially elliptically curved cross-section is produced between the two beams.

Obviously, the intersection of such a curved equisignal surface could be used in a system embodying the present invention. Curved equisignal surfaces used in this manner have their surfaces inclined in a direction normal to the line of intersection, at a greater angle relative to a horizontal plane through a particular point along the intersection than the angle of inclination of the landing path defined by the intersection. That is, the curved surfaces are inclined at the line of intersection so tangents to the surfaces are angularly inclined with respect to a lateral plane through the landing path. Equisignal surfaces may thus be produced by transmitter arrangements in a manner quite similar to that shown in Fig. 1 with the radiators positioned on each side and beyond the end of the runway to clear the landing area of all obstructions.

Any constant intensity level of a single beam, such as one of those shown in the drawings, forms a signal surface the shape of which depends upon the characteristic of the radiator. By projecting one beam from each side of the runway, the intersection of these constant intensity signal surfaces also forms a landing path. Here again it is necessary to have the angle of inclination of the signal surfaces along their line of intersection greater than the inclination of the landing path at a given point. In this manner, the angle of inclination of the signal surfaces, as measured by the angle between a line contained within said surfaces and normal to the landing path and a horizontal plane, is greater than the inclination of the landing path relative to the horizontal plane.

In order to fly an aircraft along a landing path defined by the intersection of two constant intensity signal surfaces, it is necessary to modify the receivers shown in Figs. 5 and 6. However, receivers for constant intensity work are of conventional design arranged to deflect the pointers of a cross-pointer meter to their central positions for a selected intensity of the signals received from a particular beam. The pointers of a cross-pointer indicator may thus be deflected more or less depending upon whether the intensity is greater or smaller than that of the signal surfaces of the intersection forming the landing path.

A converter similar to that shown in the receiver apparatus of Fig. 6 may also be employed in a constant intensity landing system embodying the invention for transforming displacements from one pair of coordinate axes to actuate vertical and horizontal pointers of a cross-pointer indicator.

From the foregoing description, it will be apparent that the present invention permits the arrangement of radiators remotely from the landing point, that is, the point at which the landing path intercepts the runway. This is accomplished by forming a landing path by the intersection of two inclined signal surfaces of electromagnetic energy. These signal surfaces are preferably inclined at equal angles with respect to a lateral plane through the landing path, that is, they are inclined symmetrically relative to the direction of gravity. However, they may be inclined at any angle to the lateral plane without departing from the invention. The receivers carried by the aircraft to determine its displacement relative to the landing path may employ nondirectional receiving antennas so the cross-pointer indicator is not affected by changes in the attitude of the aircraft.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a landing system for an aircraft, apparatus for defining a landing path comprising means for producing an equisignal surface of electromagnetic energy, and means for producing another equisignal surface of electromagnetic energy intersecting the first surface to form a landing path, said signal surfaces being inclined at a point on said path with respect to a horizontal plane passing through said point at an angle greater than the inclination of the landing path at said point with respect to said horizontal plane.

2. In a landing system for an aircraft, apparatus for defining a landing path comprising means for projecting a pair of beams of electromagnetic energy to form an equisignal surface between said beams, and means for projecting another pair of beams of electromagnetic energy to form another equisignal surface between said beams intersecting said first signal surface to form a landing path, said beams being arranged so said equisignal surfaces are inclined at said intersection with respect to a horizontal plane at angles greater than the inclination of said landing path.

3. In a landing system for an aircraft, apparatus for defining a landing path comprising means for producing an equisignal plane of electromagnetic energy, and means for producing another equisignal plane of electromagnetic energy intersecting said first equisignal plane to form a landing path, said equisignal planes being inclined with respect to a horizontal plane at angles greater than the inclination of said landing path.

4. The method of forming a landing path for an aircraft which comprises projecting a pair of beams of electromagnetic energy to provide an equisignal surface between said beams, and projecting another pair of beams of electromagnetic energy to provide another equisignal surface between said beams intersecting said first equisignal surface to form a landing path, said beams being arranged in a manner such that said equisignal surfaces are inclined at said intersection with respect to a horizontal plane at angles greater than the inclination of said landing path.

5. The method of forming a landing path for an aircraft which comprises producing an equisignal plane of electromagnetic energy, and producing another equisignal plane of electromagnetic energy intersecting said first equisignal plane to form a landing path, said equisignal planes being inclined with respect to a horizontal plane at angles greater than the inclination of said landing path.

6. In a landing system for an aircraft, apparatus for indicating the position of said aircraft relative to a landing path defined by two surfaces of electromagnetic energy comprising a cross-pointer indicator, and means for actuating one pointer of said indicator according to the sum, and the other pointer of said indicator according to the difference of the displacements of said aircraft relative to said surfaces.

7. In a landing system for an aircraft, apparatus for indicating the position of said aircraft relative to a landing path defined by two surfaces of electromagnetic energy comprising a receiver for producing signals corresponding to the displacement of said aircraft relative to said surfaces, a cross-pointer indicator and means connecting said cross-pointer indicator to said receiver for moving one pointer according to the sum of said signals and the other pointer according to the difference of said signals.

8. In a landing system for an aircraft having beams of electromagnetic energy providing two inclined surfaces intersecting to define a landing path, a cross-pointer indicator having vertical and horizontal pointers for indicating vertical and horizontal displacement of said aircraft relative to said landing path, means for actuating one of said pointers according to the sum of the displacements of said aircraft relative to said surfaces, and means for actuating the other of said pointers according to the difference of the displacements of said craft relative to said surfaces.

9. In a landing system for an aircraft having two pairs of beams, defining a pair of equisignal surfaces intersecting to form a landing path, apparatus for indicating the position of said aircraft relative to said landing path, comprising means actuated by a receiver according to the strength of signals from one pair of said beams for producing signals corresponding to the displacement of said craft from one of said equisignal planes, means actuated by a receiver according to the strength of signals from the second pair of beams for producing signals corresponding to the displacement of said aircraft relative to the second of said equisignal planes, a cross-pointer indicator, a circuit connecting said means for actuating one pointer of said cross-pointer indicator according to the sum of said signals, and a circuit for connecting said means for actuating the other pointer of said cross-pointer indicator according to the difference of said signals.

10. In an indicating system, apparatus for transforming displacements measured relative to one pair of coordinate axes into corresponding displacements measured relative to a second pair of coordinate axes bisecting the angles formed by said one pair of coordinate axes, comprising a pair of devices for indicating displacements relative to said second pair of axes, and means for energizing one of said devices according to the sum of the displacements relative to said first pair of axes and the other of said devices according to the difference of the displacements relative to said second pair of axes.

11. The method of indicating the position of an aircraft relative to a landing path defined by two surfaces of electromagnetic energy which comprise positioning one pointer of a cross-pointer indicator according to the sum, and the other pointer of said indicator according to the difference of the displacements of said aircraft relative to said surfaces.

12. The method of indicating the position of an object which comprises the steps of producing signals corresponding to the displacements of the object relative to one pair of coordinate axes and utilizing said signals to respectively actuate a pair of indicating devices according to the sum and difference of said displacements for indicating the position of the object relative to a second pair of coordinate axes bisecting the angles formed by said first pair of axes.

13. In a landing system for aircraft, apparatus for defining a landing path comprising first directive transmitting means for producing a first signal energy distribution in space, second directive transmitting means for producing a second signal energy distribution in space, the energy of said second distribution being distinctive from the energy of said first distribution, said first and second directive transmitting means being symmetrical about a vertical plane wherein the landing path is to be defined, said first and second directive transmitting means being aimed along a direction in said vertical plane of symmetry inclined upward at a very shallow angle of elevation, and said first and second energy distributions extending generally along said inclined direction from said first and second directive transmitting means and defining a guidance path along said inclined direction, said first directive transmitting means comprising means for defining a first relatively thin signal energy surface of appreciable width inclined steeply transverse said vertical plane and said second directive transmitting means comprising means for defining a second relatively thin signal energy surface of appreciable width inclined steeply transverse said vertical plane and intersecting said first signal energy surface in said plane and there defining said landing path.

14. In a landing system for aircraft, apparatus for defining a landing path comprising first directive transmitting means for producing a first signal energy distribution in space, second directive transmitting means for producing a second signal energy distribution in space, the energy of said second distribution being distinguished from the energy of said first distribution, said first and second directive transmitting means being symmetrical about a vertical plane wherein the landing path is to be defined and comprising means for directing the energy of said first and second distributions in fan shaped beams aimed substantially in the direction from which the aircraft is to be guided downward along the landing path, said fan shaped beams being steeply inclined in the section taken in the vertical plane transverse said plane of symmetry.

15. In a landing system for aircraft, apparatus according to claim 14 for defining a landing path, said first and second directive transmitting means each comprising means producing a second fan shaped beam also directed generally in the direction from which the aircraft is to be guided downward and forming an equi-signal surface with the respective ones of the beams defined in claim 14.

16. In a landing system for aircraft, apparatus for defining a landing path comprising first directive transmitting means for producing a first signal energy distribution in space, second directive transmitting means for producing a second signal energy distribution in space, the energy of said second distribution being distinguished from the energy of said first distribution, said first and second directive transmitting means being symmetrical about a vertical plane wherein the landing path is to be defined and comprising means for concentrating the energy of said first and second distributions toward a distant point on the landing path from which the aircraft is to approach therealong, the region of maximum intensity of the energy of said first distribution extending in a substantially fan shaped locus having a lower boundary extending along the ground through the landing point and the region of maximum intensity of the second distribution also being in a fan shaped locus having a lower boundary extending along the ground through the landing point and there intersecting the locus of the first beam.

17. In a landing system for aircraft, apparatus for defining a landing path comprising first directive transmitting means for producing a first signal energy distribution in space, second directive transmitting means for producing a second signal energy distribution in space, the energy of said second distribution being distinctive from the energy of said first distribution, said first and second directive transmitting means being symmetrical about a vertical plane wherein the landing path is to be defined, said first and second directive transmitting means being aimed along a direction in said vertical plane of symmetry inclined upward at a very shallow angle of elevation, and said first and second energy distributions extending generally along said inclined direction from said first and second directive transmitting means and defining a guidance path along said inclined direction, said first directive transmitting means defining a first signal energy surface inclined steeply transverse said vertical plane and said second directive transmitting means comprising means for defining a second signal energy surface inclined steeply transverse said vertical plane and further defining said landing path, said means for defining a first signal energy surface comprising means for generating two distinctive energy directive patterns characterized by equal intensities in said first surface and respective energy maxima on opposite sides thereof, and said means for defining a second signal energy surface similarly comprising means for generating two further distinctive energy directive patterns characterized by equal intensities in said second surface and respective energy maxima on opposite sides thereof.

RUSSELL H. VARIAN.
THOMAS M. FERRILL, Jr.

REFERENCES CITED

The following references are of record in the file of this patent:

UNITED STATES PATENTS

| Number | Name | Date |
|---|---|---|
| 1,872,975 | Kolster | Aug. 23, 1932 |
| 2,097,072 | Lock | Oct. 26, 1937 |
| 2,165,256 | Hansell | July 11, 1939 |
| 2,179,570 | Zublin | Nov. 14, 1939 |
| 2,241,907 | Hahnemann et al. | May 13, 1941 |
| 2,242,910 | Hahnemann | May 20, 1941 |
| 2,294,882 | Alford | Sept. 8, 1942 |
| 2,435,988 | Varian | Feb. 17, 1948 |